Aug. 13, 1929.  C. B. LAMBERT  1,724,356
PIE CRUST FLAKER
Filed Jan. 30, 1929
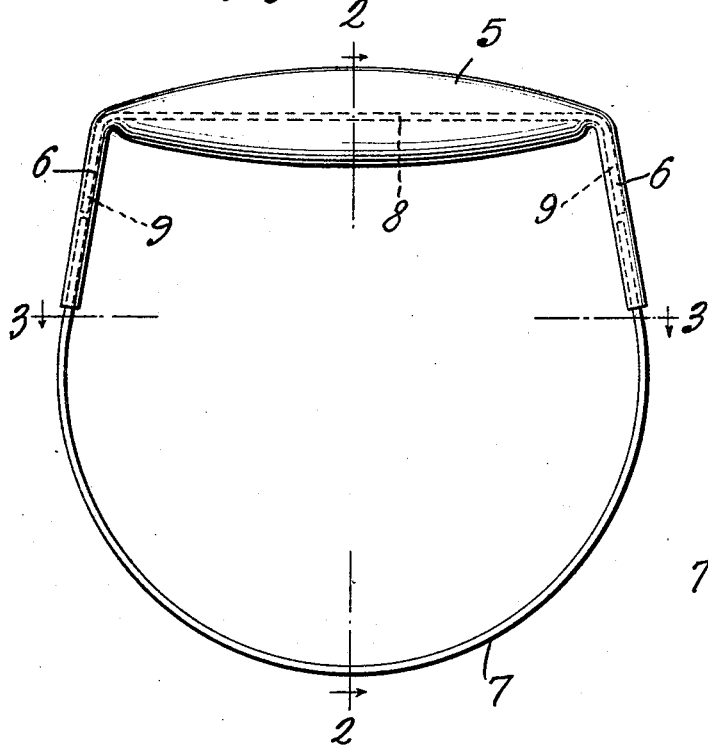
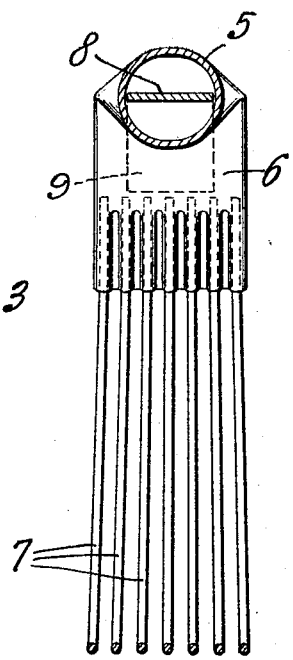
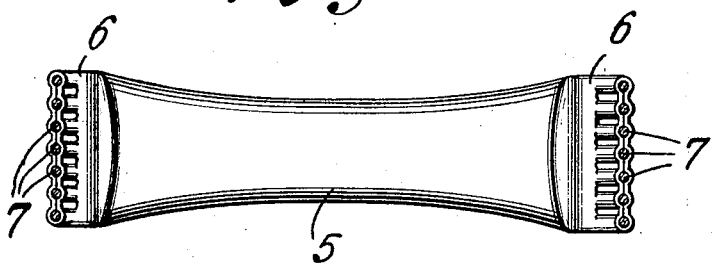
Clara B. Lambert, Inventor Patented Aug. 13, 1929.

1,724,356

UNITED STATES PATENT OFFICE.

CLARA BIRCHARD LAMBERT, OF PASADENA, CALIFORNIA.

PIE-CRUST FLAKER.

Application filed January 30, 1929. Serial No. 336,214.

This invention relates to a device especially designed for mixing or flaking pie crust and aims to improve generally the construction as set forth in my Patent No. 1,645,062.

The primary object of the invention is to provide a novel form of handle which will absolutely insure sanitation by the elimination of shoulders and crevices into which the dough could collect.

A still further object of the invention is to provide a handle section which is tubular in formation to conveniently fit within the hand of the user, the ends of the handle being extended at right angles to the handle to receive the ends of the wire loops or body portion of the flaker.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a pie crust flaker constructed in accordance with the invention.

Figure 2 is a sectional view taken on line 2—2 of Figure 1.

Figure 3 is a sectional view taken on line 3—3 of Figure 1.

Referring to the drawing in detail, the reference character 5 designates the handle portion of the flaker which embodies a length of steel or brass drawn seamless tubing portions of the length of tubing at the ends thereof being flattened as at 6 and extended at approximately right angles to the handle portion, as clearly shown by Figure 1 of the drawing.

The handle which is preferably tubular in formation is provided with a reinforcing member 8 that extends throughout the length thereof, the ends of the reinforcing member 8 being bent with the ends of the handle portion to reinforce the ends of the handle portion and prevent the ends of the handle portion from bending outwardly while the device is in use.

As shown this member 8 is formed of a length of metal, of a width to permit it to be readily positioned within the tube of which the handle is formed, prior to the bending operation, with the result that the member 8 is securely held in position.

The body portion of the flaker includes loop members 7 formed preferably of lengths of wire arranged in transverse parallel relation with respect to each other, the ends of the lengths of wire being extended into the ends 6 of the handle portion where they are secured in position by pressing portions of the ends into close engagement with the ends of the loops, in a manner as shown by Figure 3 of the drawing.

From the foregoing it will be obvious that due to this construction the handle of the flaker is absolutely free of shoulders and recesses which permit of the collection of dough or other foreign matter which would render the flaker unsanitary.

It will further be seen that the material between the ends of the loops is pressed closely together securely locking the ends of the loops to the handle.

I claim:

1. In a pie crust flaker, a handle portion formed of a length of tubular seamless metal, the ends thereof being extended at approximately right angles, a plurality of loop members, the ends of the loop members being extended into the ends of the handle portion, and said loop members being secured within the ends of the handle portion.

2. In a pie crust flaker, a handle portion formed of a length of tubular seamless metal, the ends thereof being extended at approximately right angles, loop members formed of lengths of wire material, the ends of the loop members being positioned in the ends of the handle portion, the ends of the handle portion being pressed to flatten them, and portions of the ends of the handle being pressed into engagement with the loop members.

3. In a pie crust flaker, a handle portion formed of a length of tubular metal, a metallic strip extended through the handle portion, the ends of the handle portion and metallic strip being extended laterally, the portions of the tubular metal surrounding the metallic strip being pressed into close engagement with the metallic strip, and loop members having their ends held between the sides of the tubular portion.

4. In a pie crust flaker, a handle portion formed of a length of tubular metal, a filler embodying a length of flat metal material extended into the handle, the ends of the tubular metal and the filler being bent laterally to secure the filler in the handle, and loop members having their ends secured within the ends of the handle.

In testimony that I claim the foregoing as my own, I have hereto affixed my signature.

CLARA BIRCHARD LAMBERT.